United States Patent [19]

Blissell et al.

[11] Patent Number: 4,723,359
[45] Date of Patent: Feb. 9, 1988

[54] SPENT FUEL ROD HORIZONTAL CONSOLIDATION SYSTEM AND METHOD

[75] Inventors: William H. Blissell, Elizabeth Township, Allegheny County, Pa.; Ralph E. Watts, Harrison, Ohio

[73] Assignee: Westinghouse Electric Corp., Pittsburgh, Pa.

[21] Appl. No.: 874,241

[22] Filed: Jun. 13, 1986

[51] Int. Cl.⁴ .............................................. B23P 19/00
[52] U.S. Cl. .................................. 29/723; 29/400 N; 376/261; 376/272
[58] Field of Search ............... 29/400 N, 426.3, 426.4, 29/723; 376/261, 272; 250/626; 252/108

[56] References Cited

U.S. PATENT DOCUMENTS

| | | | |
|---|---|---|---|
| 3,807,018 | 4/1974 | Ehrman et al. | 29/723 X |
| 3,855,684 | 12/1974 | Kendall | 29/723 |
| 4,175,318 | 11/1979 | Matsuura | 29/723 |
| 4,619,808 | 10/1986 | Formanek | 376/272 |
| 4,636,351 | 1/1987 | Rohr | 376/272 |
| 4,650,640 | 3/1987 | Lahr et al. | 376/261 |
| 4,659,536 | 4/1987 | Baudro | 376/272 X |

Primary Examiner—Z. R. Bilinsky
Assistant Examiner—Glenn L. Webb
Attorney, Agent, or Firm—E. C. Arenz

[57] ABSTRACT

The system of the invention includes a downender station 10 which receives and secures a spent fuel assembly 20 in a vertical disposition and is then pivoted to a horizontal position after the upper nozzle has been removed, and a second station 12 generally aligned with the first station includes a multiple rod gripper 56 which is used to grip onto the exposed fuel rod ends and pull the fuel rods to an upper horizontal location in the second station, with horizontal and vertical combs 60 and 62 maintaining the original square pitch array of the rods, and the rods are then dropped into a reconfiguring structure 70 where they assume a more compact array, the rods then being pushed by pusher 74 into a storage canister 26 carried by the downender below the fuel assembly 20. The arrangement permits compacting fuel rods from two fuel assemblies into a storage canister 26 having approximately the same transverse cross-sectional area as a single fuel assembly.

8 Claims, 7 Drawing Figures

4,723,359

SPENT FUEL ROD HORIZONTAL CONSOLIDATION SYSTEM AND METHOD

BACKGROUND OF THE INVENTION

Spent fuel storage has traditionally been part of the responsibility of the operator of commercial nuclear plants. Many utilities anticipated that by this time there would be commercially accessible fuel reprocessing plants available and accordingly designed and constructed relatively small spent fuel pools. In some instances the storage pools are nearly full and further plant operations may have to be halted unless additional spent fuel can be disposed of. This storage problem has been recognized along with the short term solution of fuel consolidation by which fuel assemblies are disassembled and their components are compacted and canistered such that the volume occupied by the spent fuel elements is substantially reduced.

So far as we know, most fuel rod consolidation systems have been designed with the fuel assembly axis vertically disposed to conform to the spent fuel pool physical space parameters.

U.S. Pat. No. 4,446,098 is an example of a system in which the consolidation is shown as being carried out with the fuel assemblies and rods disposed in a vertical orientation, although horizontal consolidation is said to be equally effective.

It is our belief that there are advantages to providing a basically horizontal system for rod removal and consolidation. A horizontal system according to our invention need be no more than approximately 30 feet (9 m) in length. Some pools have space available to accommodate this length. A horizontal system according to our invention may also be supported off the operating floor, or from empty storage racks requiring no floor space in reactor spent fuel pools. Further the system can be designed to eliminate any electrical power supplies required for operation and the system can be operated and actuated by long-handle tooling in reactor pools, or by impact wrenches and other tools in dry-hot cells.

Accordingly, it is the aim of our invention to provide a horizontal fuel rod consolidation system and method for handling spent fuel rods from a single fuel assembly at one time.

SUMMARY OF THE INVENTION

In accordance with the invention, a fuel consolidation means and method is provided in which a fuel assembly is received in a vertical disposition on a vertically disposed downender subsystem to which the assembly is tightly clamped, the upper nozzle is removed and the downender is then moved to a horizontal position in general horizontal alignment with a spent fuel extraction and reordering subsystem which includes a horizontally movable carriage having a multiple fuel rod end gripper for gripping all of the fuel rods, the carriage then being moved horizontally to extract fuel rods from the fuel assembly skeleton, with both horizontal and vertical combs being actuated during the movement of the fuel rods to maintain the fuel rods in their original square pitch array, the fuel rods then being dropped into an underlying reconfiguring die once the rods have reached their fully extracted position. The fuel rods are then pushed into a horizontally disposed storage canister carried on the underside of the downender, the rod being in a relatively compact, closely packet triangular array as inserted into the canister. Thereafter the downender is again moved to a vertical position for removal of the fuel assembly skeleton therefrom and for receipt of another spent fuel assembly from which the rods are to be removed. The system then carries out the same basic process as has been described, so that the storage canister, which has approximately the same transverse cross-sectional area as a single fuel assembly, will be adapted to receive the fuel rods from two fuel assemblies.

DRAWING DESCRIPTION

DESCRIPTION OF THE PREFERRED EMBODIMENT

Figure 1:
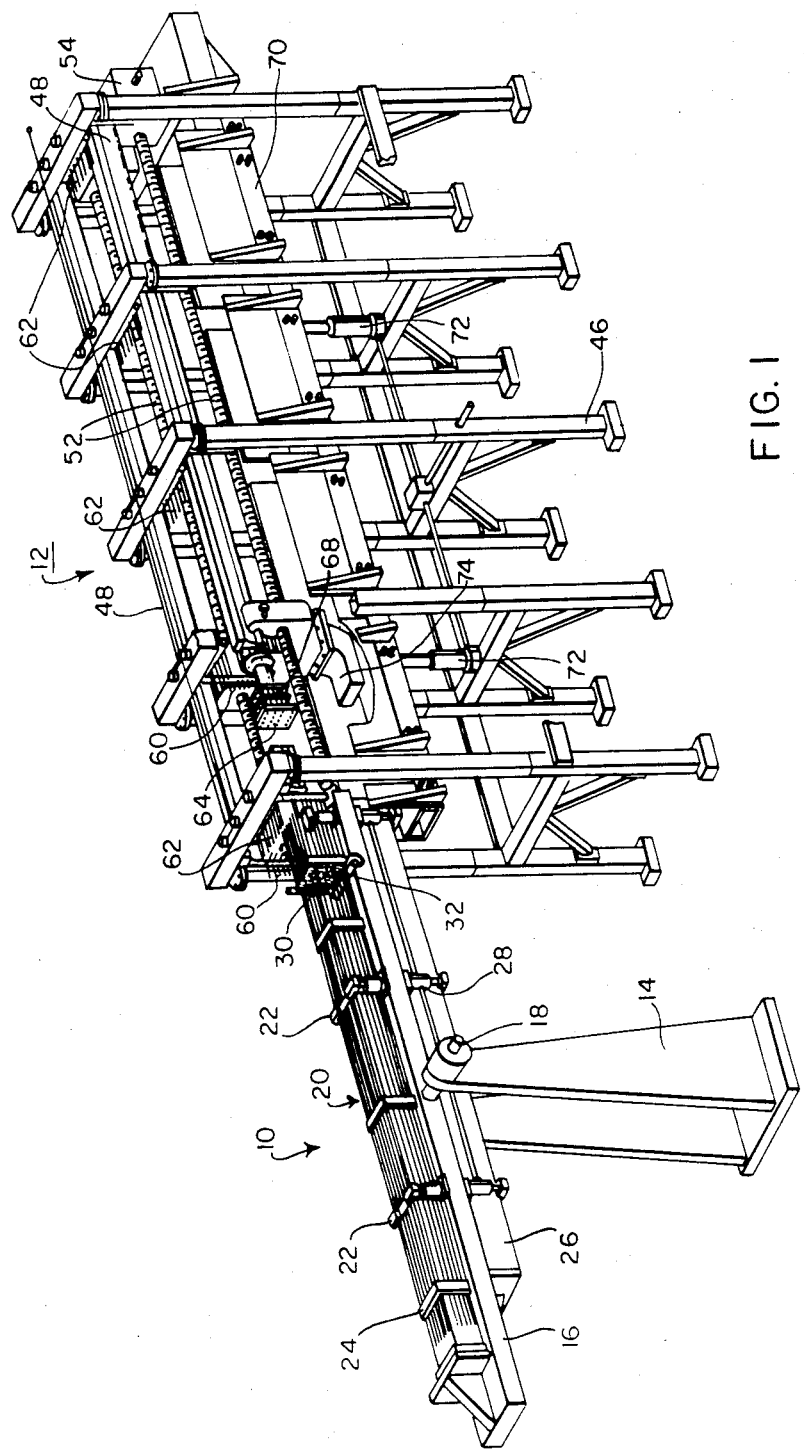
FIG. 1 is an isometric view, somewhat schematic in some details, of most of the basic equipment for carrying out the invention.
Figure 1A:
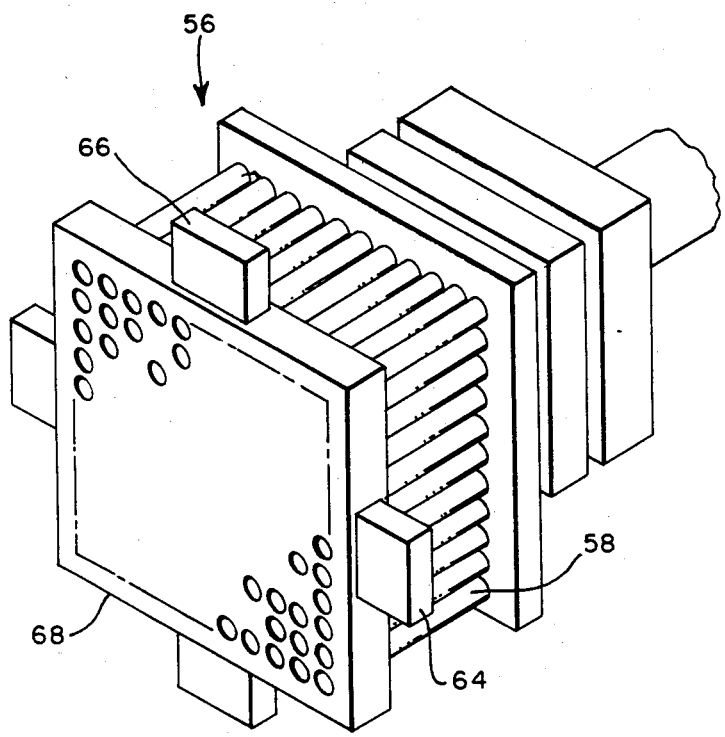
FIG. 1A is an isometric view, enlarged relative to FIG. 1, of a multiple, collet gripper assembly which may be used, for example, in the invention.

The major parts of the system for carrying out the invention are illustrated in FIG. 1 including a first downender station generally designated 10 and a second, rod extracting and reordering station generally designated 12.

Figure 2:
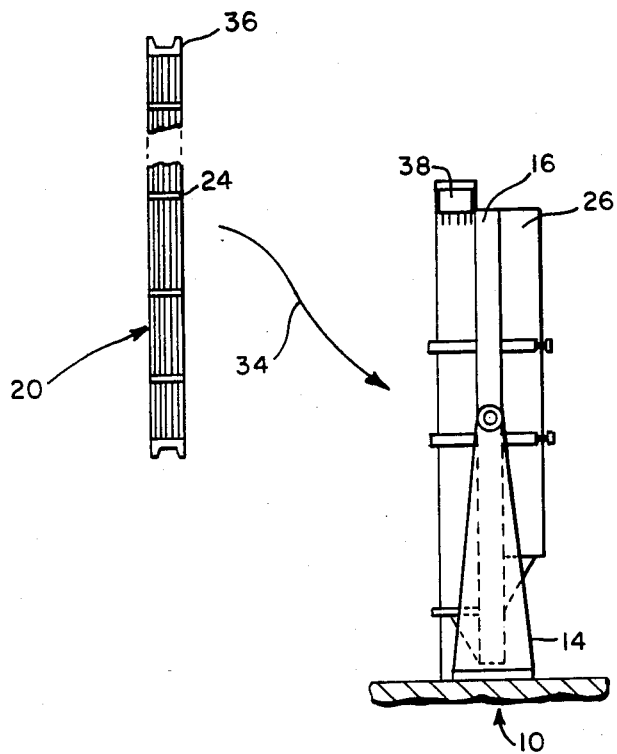
FIG. 2 is a mostly schematic view of the downender in a vertical position adapted to receive a fuel assembly.

The downender station 10 includes a support 14 which carries a pivotal platform 16 which can be driven by gear drive 18 between its horizontal position shown in FIG. 1 to a vertical position as shown in FIG. 2. A fuel assembly generally designated 20 is shown in FIG. 1 on the upper side of the platform 16 where it is securely held in place by clamps 22 which clamp over the requisite number of grids 24 of the fuel assembly to insure retention of the fuel assembly during manipulations and rod extraction. A rod storage canister 26 is secured to the under side of the platform by means of clamps 28. The platform 16 also carries a pivotal horizontal comb structure 30 and a vertical comb structure 32. While these combs are not shown in connection with FIGS. 2 and 3 relating to the placement of a fuel assembly on the platform and the removal of a top nozzle, it is to be understood that they are pivoted into place after the fuel assembly 20 has been secured to the platform in its vertical position and before the top nozzle and the top grid are removed from the fuel assembly. Also, for clarity in FIG. 1, these combs 30 and 32 are shown to be some distance from the unsecured ends of the fuel rods while in actuality these combs would be more closely adjacent the location of the removed top grid of the fuel assembly.

Turning to FIG. 2, the downender 10 is shown with the platform 18 disposed in a vertical orientation. A spent fuel assembly 20 from which the individual fuel rods are to be removed is shown apart from the downender with the arrow 34 indicating that the assembly is to be moved to the one face of the platform 18 so that the upper end of the assembly including the nozzle 36 will be in a position such that the guide tube cutter 38 can be easily positioned to register with the guide tubes to perform the cutting function. The general construction of one type of fuel assembly which may be disassembled in carrying out the invention is shown in U.S. Pat. No. 3,791,466. It should be apparent that from the construction shown therein that if all of the control guide tubes or thimbles are severed at a location immediately below the uppermost grid, the nozzle 36, a short length of guide tube and the uppermost grid 24 can be removed from the remainder of the fuel assembly, leaving the upper ends of the fuel rods exposed for subsequent gripping for extraction purposes. The multiple tube cutter is not per se a part of this invention since such tube cutters are known. The currently preferred type of tube cutter is driven by a multi-spindle drive, such as produced by Zagar Inc., of Cleveland, Ohio, with the internal diameter tube cutters severing the tube with cutters operating by centrifugal force as the spindles are rotated.

Figure 3:
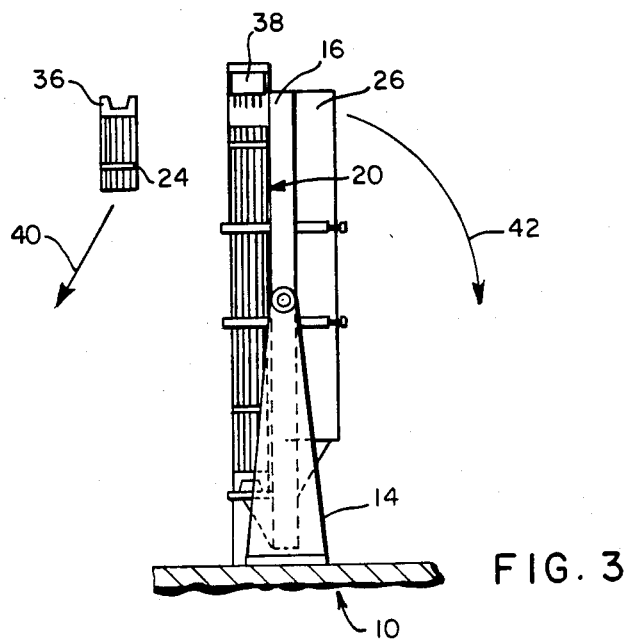
FIG. 3 is a view similar to FIG. 2 but with the fuel assembly in position and with the upper nozzle and first grid removed.

Turning to FIG. 3, after the nozzle 36 and grid 24 have been separated they are off loaded as indicated by the arrow 40 so that the downender with the attached fuel assembly is ready to be pivoted as indicated by the arrow 42 to the horizontal position as shown in FIG. 1.

Figure 4:
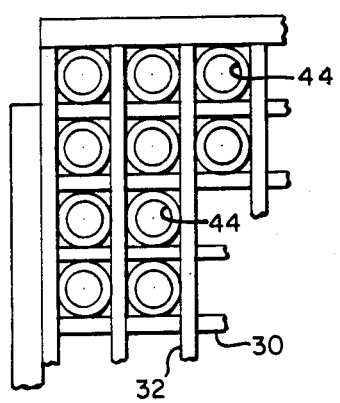
FIG. 4 is a fragmentary view illustrating the way a vertical comb and horizontal comb arrangement maintain the original square pitch array of the fuel rods.

It is noted that prior to severing the control guide tubes the vertical and horizontal combs (FIG. 4) have been positioned to preserve the original square pitch array of the spent fuel rods 44. The relationship between combs and rods as shown in FIG. 4 is the same relationship as exists with the combs associated with the rod extraction station 12 of FIG. 1.

Referring to FIG. 1, the second station 12 is supported by structural frame means 46 so that the horizontal movable parts are properly aligned with the downender in its horizontal position. A pair of horizontal guide rails 48 support a carriage 50 adapted to be moved to an extended left position (FIG. 1) or a retracted right position by a pair of screw drives 52 adapted to be rotated by a ball screw drive gear box 54 located at that end of the second station opposite the downender. The carriage 50 carries a multiple fuel rod gripper device 56 which has as many discrete gripper elements 58 as there are fuel rods to be gripped for the particular fuel assembly 20 which is to be disassembled. The currently preferred multiple rod gripper is of the split collet type which is a known type of gripper for rods of this type. Details about such grippers are found in U.S. Pat. No. 4,551,299 and U.S. patent application Ser. No. 564,053 filed Dec. 21, 1983. The multiple rod gripper 56 is moved into position at the end of the second station 12 where the exposed ends of the fuel rods 44 are located. After all of the rods have been gripped by the gripper 56, the gripper is then moved, through operation of the ball screw drives 52 towards its retracted position at the right end of the second station. As the fuel rods are pulled progressively from the fuel assembly 20, successive horizontal and vertical combs 60 and 62 are successively actuated to interleave with the fuel rods to maintain the original square pitch aray of the fuel rods. In the illustrated second station of FIG. 1 there are four locations where these combs are located for the purpose noted. The actuation of the combs to the positions interleaving with the rods is accomplished by the position of cam actuators 64 and 66 on the edges of the end plate 68 of the gripper.

Once the gripper 56 has reached its fully retracted position at the right end of the second station, the individual fuel rods will have been moved to an upper horizontal position 69 in the second station and are supported in columns and rows as in their original square pitch array by the combs 60 and 62 and the gripper at the right end.

Underlying this upper horizontal position of the rods is a reconfiguring die or structure 70 which has the basic transverse shape of an upwardly open rectangular box or trough. With the rods in the upper horizontal position the horizontal combs 60 are released by operating release linkage 71 and the multiple rod gripper in its retracted position is released, and the fuel rods will cascade down in vertical columns into the reconfiguring die 70. The reconfiguring structure 70 is supported by several jack screw drives 72 which permits the elevation of the reconfiguring structure to be changed.

Figure 6:
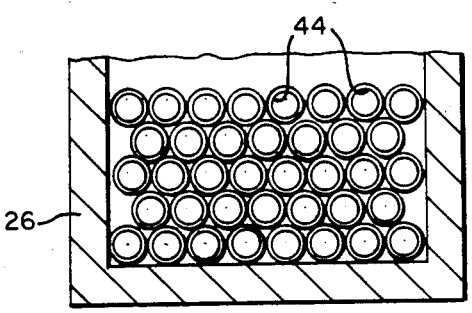
FIG. 6 is a fragmentary, transverse cross-sectional view through the storage canister to illustrate the compacted triangular pitched array of the ruel rods therein.

The carriage 50 also supports a rod pusher die 74 which will also be in a right end retracted position when the multiple rod gripper is in that location. The pusher die is mounted to the carriage through means, such as spring means, which will maintain the pusher die at the lower level of the reconfiguring structure. With the load of fuel rods 44 from the first fuel assembly to be disassembled in the reconfiguring structure because of the removal of the combs which maintained the original square pitch array, these rods are ready to be placed in the lower portion of the storage canister 26. If desired, additional means for finalizing the reordering of the fuel rods in the reconfiguring structure may be provided, such as a vibration system or some other arrangement. With the configuring structure 70 lower portion aligned with the lower section of the storage canister 26, the carriage and pusher die 74 is driven from right to left to push the fuel rods into the lower part of the storage canister 26 is in FIG. 6. It will be appreciated that as the pusher die moves the rods into the canister, the multiple rod gripper 56 is agains moved to its extended position ready to accept the rods from the next fuel assembly.

Figure 5:
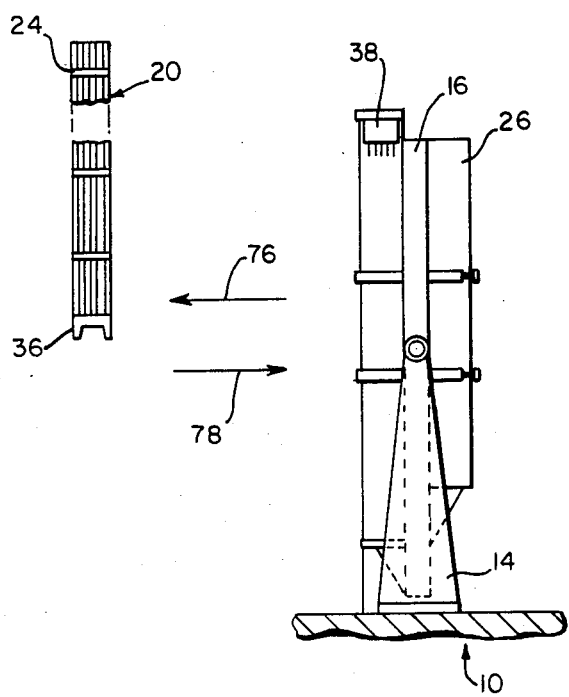
FIG. 5 is a view of the downender again in a vertical position for off loading the skeleton of the fuel assembly from which fuel rods have been removed prior to reloading another fuel assembly on the downender.

The downender platform 16 carrying the skeleton of the fuel assembly 20 is then moved again to a vertical position as in FIG. 5 and the skeleton 20A is then off loaded from the platform as indicated by the arrow 76 and a second intact spent fuel assembly is on loaded to the platform as indicated by the arrow 78. The upper nozzle and grid of the second fuel assembly is then removed as has been described hereinbefore and the downender platform 16 is returned to a horizontal position as in FIG. 1. The removal of the rods is the same as described hereinbefore and the second set of rods are dropped into the reconfiguring structure 70, and pushed into the upper section of the storage canister 26.

The storage cansiter is sized to have a transverse cross-sectional area approximately the same as that of an intact fuel assembly, and is capable of accepting the fuel rods of two fuel assemblies. After the storage canister 26 is full, the platform 16 of the downender is again moved to a vertical position to remove the filled storage canister and to provide a replacement empty canister.

Regarding general matters in connection with the invention, different types of fuel assemblies may have different constructions which require clamping and nozzle removal means sonewhat different than that described in connection with the example of a PWR type fuel assembly. For example, with a 7×7 BWR assembly, all of the grids are clamped to the platform since there is no other structure than the fuel rods which will maintain the grids in their relative positions during removal of the rods. Also the BWR assemblies may have nuts securing the top end fitting of the assembly so that such nuts are removed to permit removal of the top end fitting.

Occasionally one or more fuel rods from a given assembly may become essentially stuck during the attempt to remove the fuel rods. Since it is not desirable that the rods be fractured, the gripper may be provided with spring release means which permit the release of an individual fuel rod when the pulling force exceeds a predetermined limit, such as 150 pounds (67 kg). In such cases the removal of the fuel rod from the remainder of the fuel assembly skeleton takes place in a way not a part of this invention.

Among the advantages and features of the invention are the following. The system is a self-contained, remotely accessed system for use in either wet or dry environments for the disassembly and volume reduction of either spent BWR or PWR fuel assemblies. By providing the storage canister secured in the same length as the original fuel assembly from which the rods are removed, the overall length of the system is decreased by the length of the canister. This decrease in system length potentially provides the capability of "at reactor site" consolidation and pools. This sytem may also be supported from the side of the pool requiring no floor space to consolidate fuel in reactor pools. The system is designed to eliminate if necessary any electric power supplies required for operation. It can be operated and actuated by long-handled tooling in reactor pools, or impact wrenches in dry-hot cells.

We claim:

1. An arrangement for consolidating spent nuclear fuel rods from a fuel assembly, comprising:
   a first station including downender means including platform means having a vertical position for receiving one said fuel assembly in a vertical orientation, and having an alternate horizontal position for removal of said rods from said assembly;
   clamp means securing said assembly in said vertical orientation to said platform means;
   means for removing at least the upper nozzle from said assembly in its vertical orientation;
   first insertable comb means carried by said platform means and near the upper nozzle end of said assembly positioned to preserve the original square pitch array of said rods;
   a second station, for rod extraction and reordering, in general horizontal alignment with said downender means in its horizontal position, including;
   rod gripper means adapted to grip all of said rods at their ends adjacent said seconds station;
   second insertable comb means associated with said second station and positioned to preserve a square pitch array of said rods;
   means for moving said rod gripper means horizontally from a position adjacent said first station to an opposite position adjacent the opposite end of said second station to pull all of said rods continuously gripped out of said assembly to an upper horizontal position within the length of said second station;
   reconfiguring die means underlying said upper horizontal position of said rods in said second station;
   means releasing said rods to permit them to drop into said die means for reconfiguring said rods into a substantially more compact array than said square pitch array;
   means for pushing said rods in their more compact array from said reconfiguring die means to a horizontal position underlying said platform of said first station;
   storage canister means releasably carried below said platform to receive said reconfigured rods through one open end of said canister.

2. An arrangement according to claim 1 wherein:
   said rod gripper means and said rod pushing means are connected for simultaneous parallel movement so that as said rods are extracted from said assembly to said second station, said pushing means is moved to a retracted position adjacent said opposite end of said second station.

3. An arrangement according to claim 1 including:
   means to actuate said second comb means into position to preserve said square array as said gripper is moved to said opposite position.

4. An arrangement according to claim 1 including means for positioning said reconfiguring die means in an upper and a lower position.

5. An arrangement according to claim 4 wherein:
   said storage canister has a transverse cross-sectional area approximately equal to that of an intact fuel assembly and capable of accepting the fuel rods of two fuel assemblies.

6. The method of consolidating spent nuclear fuel rods from a fuel assembly, comprising:
   delivering a first fuel assembly to a vertically disposed downender;
   clamping said fuel assembly to said downender;
   removing at least the upper nozzle from said assembly;
   inserting first comb means between said fuel rods near the nozzle end to preserve the original square pitch array of the fuel rods;
   operating said downender to place said downender in a generally horizontal position;
   gripping all of said rods at their nozzle ends with gripper means;
   pulling on all of said tubes in one horizontal direction to remove all, or substantially all, of said tubes from the remainder of said fuel assembly and to a separate horizontal position;
   inserting additional comb means between said fuel rods, in successive locations as said rods are moved horizontally, to preserve said original square array;
   releasing said rods to drop them into a reconfiguring die underlying said separate horizontal position to reconfigure said rods into a compact array;
   pushing said rods with pushing means in the opposite horizontal direction into a storage canister carried by said downender in a horizontal position below said remainder of said fuel assembly.

7. The method of claim 6 including:
   then operating said downender to a vertical position and removing said first fuel assembly remainder therefrom;
   moving said reconfiguring die to a different height and again carrying out the steps of claim 6.

8. The method of claim 6 including:
   moving said gripper means and said pusher means in unison in their horizontal movements.

* * * * *